(12) United States Patent
Bowman

(10) Patent No.: US 7,828,938 B2
(45) Date of Patent: Nov. 9, 2010

(54) HYBRID WATER AND POWER SYSTEM

(75) Inventor: Michael John Bowman, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 1397 days.

(21) Appl. No.: 11/250,017

(22) Filed: Oct. 12, 2005

(65) Prior Publication Data
US 2007/0080100 A1  Apr. 12, 2007

(51) Int. Cl.
*C02F 1/02* (2006.01)
*B01D 63/00* (2006.01)

(52) U.S. Cl. .................. 202/176; 210/175; 210/250; 210/257.2

(58) Field of Classification Search ............... 210/170, 210/747, 652, 739, 742, 175, 251, 257.2; 202/176
See application file for complete search history.

(56) References Cited

U.S. PATENT DOCUMENTS

| | | | | |
|---|---|---|---|---|
| 5,329,758 | A * | 7/1994 | Urbach et al. .............. | 60/775 |
| 6,216,463 | B1* | 4/2001 | Stewart ..................... | 60/641.2 |
| 6,616,415 | B1* | 9/2003 | Renken et al. ............. | 417/44.1 |
| 2003/0230534 | A1* | 12/2003 | Donaldson et al. ......... | 210/652 |
| 2005/0072164 | A1* | 4/2005 | MacKay .................... | 60/805 |
| 2005/0103643 | A1 | 5/2005 | Shoup | |

FOREIGN PATENT DOCUMENTS

WO  WO 9933751 A1 * 7/1999

OTHER PUBLICATIONS

James E. Miller, "Review of Water Resources and Desalination Technologies", *Sand Report, SAND*2003-0800, *Sandia National Laboratories*, Printed Mar. 2003, pp. 3-54 (2003).
Hasan Fath, et al., "Numerical Simulation and Analysis of a Patented Desalination and Power Co-generation Cycle", *Elsevier Science B.V. Desalination 169*, pp. 89-100 ( 2004).
Jacques de Gunzbourg, et al., "Co-generation Applied to Very High Efficiency Thermal Seawater Desalination Plants", 1999 *Elsevier Science BV, Desalination 125*, pp. 203-208 (1999).
A. Sagle, et al., "Fundamentals of Membranes for Water Treatment", pp. 1-17.

* cited by examiner

*Primary Examiner*—Duane Smith
*Assistant Examiner*—Cameron J Allen
(74) *Attorney, Agent, or Firm*—Patrick K. Patnode

(57) ABSTRACT

A hybrid water and power system comprises a power generation device for generating electricity and waste heat and a thermal purification system that utilizes at least a portion of the waste heat to cleanse nonpotable water introduced therein to produce a semi-cleaned water stream and a water filtration system for receiving and processing at least a portion of the semi-cleaned water stream to produce a potable water stream. In one embodiment, a containerized hybrid water and power unit comprises a power generation device, a thermal purification system and a water filtration system, and is housed in a containment vessel. Containerized water and power unit has an input for fuel and nonpotable water and produces both electricity and potable water.

35 Claims, 3 Drawing Sheets

HYBRID WATER AND POWER SYSTEM

BACKGROUND

The invention relates generally to water purification and electricity generation and more specifically to a hybrid water purification and power generation system.

Water is the most bountiful substance on the surface of the Earth, and every type of life form depends on it for survival. However, approximately ninety eight percent of water is ocean seawater or brackish water, and another one percent is captive in the polar ice caps.

Much of the remaining water is non-potable because of contamination or industrial use. Overall, the global supply of potable water is dwindling and the need for improved purification of non-potable water is great. It is estimated that nearly one billion people lack access to potable water on a daily basis. About five million people die each year from drinking water related illness. In most of these troubled areas, water is available but it is laced with microbiological or chemical contaminants or is nonpotable ocean or seawater.

Accordingly, there is a need for a system that can produce potable water from a non-potable water source in an economic fashion and for a system that can be easily transported to regions that need potable water.

BRIEF DESCRIPTION

A hybrid water and power system comprises a power generation device for generating electricity and waste heat and a thermal purification system that utilizes at least a portion of the waste heat to cleanse non-potable water introduced therein to produce a semi-cleaned water stream and a water filtration system for receiving and processing at least a portion of the semi-cleaned water stream to produce a potable water stream. In one embodiment, a containerized hybrid water and power unit comprises a power generation device, a thermal purification system and a water filtration system, and is housed in a containment vessel. Containerized water and power unit has an input for fuel and nonpotable water and produces both electricity and potable water.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
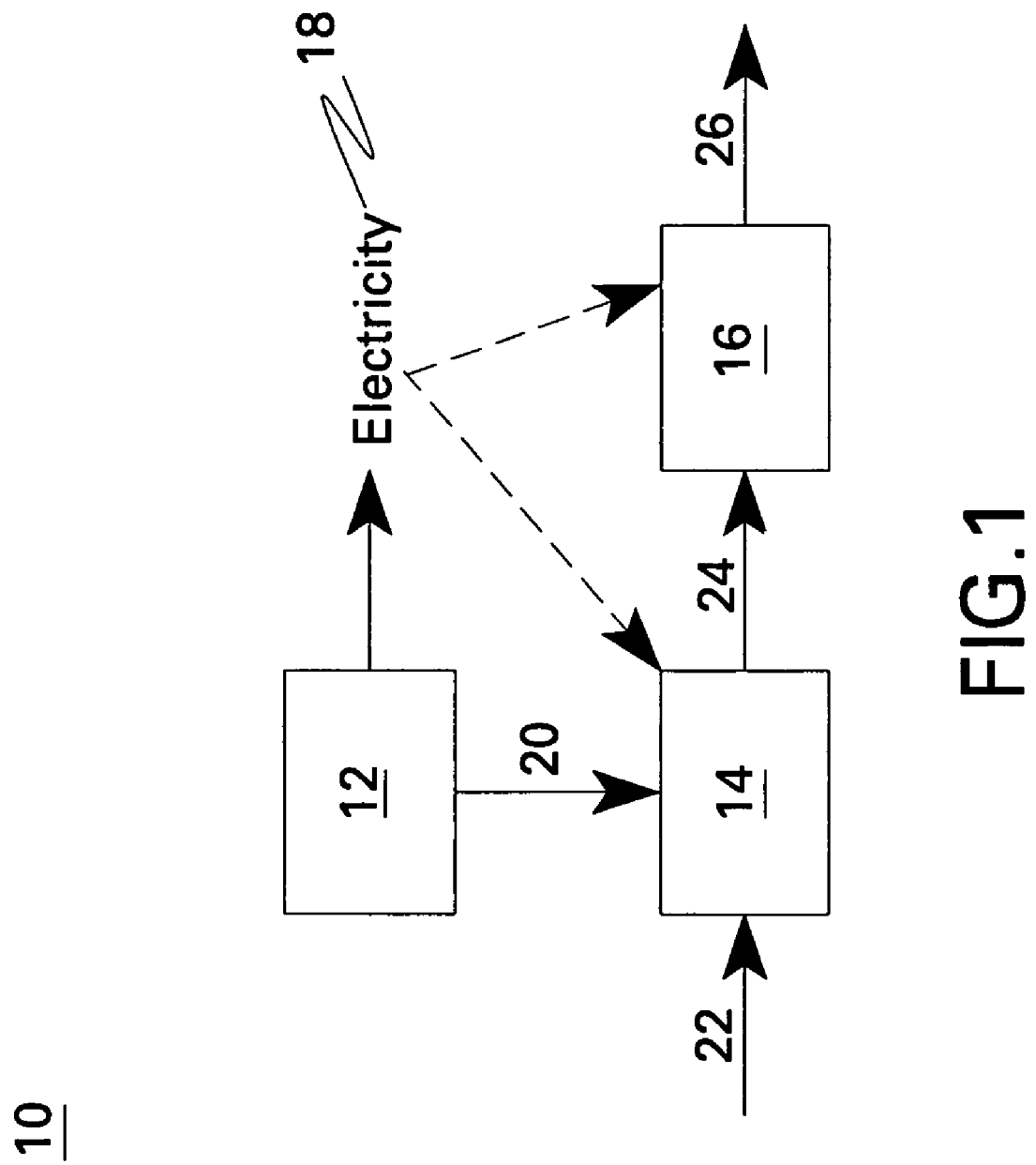
FIG. 1 is a schematic illustration of a hybrid water purification system in accordance with one embodiment of the instant invention.

A hybrid water and power system 10 comprising a power generation device 12 for generating electricity and waste heat, a thermal purification system 14 that utilizes at least a portion of the waste heat to cleanse nonpotable water to produce a semi-cleaned water stream and a water filtration system 16 for receiving and processing the semi-cleaned water stream to produce a potable water stream, is shown in FIG. 1. As discussed above, many regions in the world have a need to convert nonpotable water into drinking water. In addition, many of these regions have a growing need for electricity generation. System 10 provides a solution to each of these needs by providing an all-in-one system that provides both purified potable water and electricity generation. System 10, as discussed in more detail below, is a tunable system that will permit the users to vary the purification of water and the production of electricity depending on the need or desired output.

Power generation device 12 is typically a distributed power generation device that conventionally produces between about 50 kw to about 3000 kw of power and operates at an electrical efficiency in the range between about 15% to about 40%, for example a reciprocating engine or a gas turbine. Several commercial examples of power generation 12 are an advanced microturbine that produces about 175

| KW | Electical Efficiency | Air Flow lb/hr | Q Available btu/hr |
|---|---|---|---|
| 100 | 32% | 1,517 | 145,661 |
| 250 | 35% | 3,468 | 332,939 |
| 500 | 40% | 6,069 | 582,643 |
| 750 | 38% | 9,583 | 919,963 |
| 1000 | 40% | 12,138 | 1,165,286 |
| 2000 | 42% | 23,121 | 2,219,593 |
| 175 | 35% | 10,800 | 777,600 |
| 2000 | 24% | 73,656 | 13,258,080 |

KW and has an electrical efficiency of about 35%; a GE reciprocating engine that produces about 500 KW of power output and has an electrical efficiency of about 40%; or a small gas turbine that produces about 2000 KW of power output and has an electrical efficiency of about 24%. Table 1 illustrates a number of commercially available power generation devices that would be suitable as power generation device 12.

Table 1 represents a sample of characteristics of a range of potential prime movers that can be used as the power generation device 12. The first column (KW) corresponding power output of the selected power generation device 12. The second column (Eletrical Efficiency) is the estimated electrical efficiency of the corresponding power generation device 12 and the third column (airflow) is the corresponding airflow measured in pounds per hour. Utilizing these parameters and practical thermodynamic limitations, the amount of energy (Q) available in the exhaust can be estimated, as shown in the fourth column (Q Available). These energy values, measured in btu/hr, can then be used to size the appropriate thermal purification system 14 that will utilize a portion of this available energy to purify non-potable water.

As discussed above, power generation device 12 produces electricity 18 but due to the effeciency levels of these devices, it also produces a significant amount of available energy in the exhaust gas 20. Exhaust gas 20 energy will vary depending on the power generation device 12 based on airflows and efficiencies. As shown in the column entitled Q available BTU/ Hr, substantial quantities of excess heat are available within these devices in the form of the exhaust gas 20. The electricity 18 generated by power generation device 12 can be used for any suitable purpose including for supplying electricity 18 to a grid or to a storage device. In addition, electricity 18 can be utilized to energize the components within the hybrid water and power system 10.

The thermal purification system 14 is in thermal communication, typically via at least one and commonly more than one heat exchanger, with the exhaust gas 20 of the power generation device 12. The exhaust gas is in thermal communication with the thermal purification system 14 in such a manner that the heat is used to energize the system in the same manner as a traditional thermal purification system uses a combustor, boiler or electrical heating source. Nonpotable water 22 is introduced into the hybrid water and power system 10 and is cleansed by the thermal purification system 14 to produce a semi-cleaned water stream 24. As used herein the term "non-potable water" means water that is not suitable for drinking including, for example, brine water; saltwater; ground water; waste water; contaminated water, chemically, microbial, or otherwise; or raw water.

Thermal purification system 14 can include any system that utilizes high temperature processes to purify water. In one embodiment, thermal purification system 14 is a multi-stage flash (MSF) unit that purifies the nonpotable water 22 using a series of evaporation and condensation steps. The evaporation and condensation steps are coupled in MSF so that the latent heat of evaporation is recovered for reuse to heat the incoming water. To maximize water recovery, each stage of the MSF system typically operates at a successively lower pressure. After processing through a series of stages in the MSF system, the nonpotable water 22 is purified and a semi-cleaned water stream 24 is produced. In another embodiment, thermal purification system 14 is a multi-effect evaporation system (MEE) that purifies nonpotable water using a series of evaporation and condensation states in a similar fashion to MSF, except that vapor from each stage is condensed in the next successive stage thereby giving up a portion of its heat to drive more evaporation.

Again, in order to increase performance, each stage in an MEE system is typically run at a successively lower pressure. After processing through a series of stages in the MEE system, the nonpotable water 22 is purified and a semi-cleaned water stream 24 is produced. In another embodiment, thermal purification system 14 is a vapor compression system, for example a mechanical vapor compression (MVC) system or a thermal vapor compression (TVC) system. MVC systems typically only have a single stage, while TVC systems typically have multiple stages. Again, after processing through the MVC or TVC system, the nonpotable water 22 is purified and a semi-cleaned water stream 24 is produced.

Water filtration system 16 receives and processes the semi-cleaned water stream 24 to produce a potable water stream 26. Water filtration system 16 can comprise any convention filtering system that is utilized to remove organics, salts, ionically charged particles, viruses, bacteria, including, without limitation, crossflow filtration systems; reverse osmosis systems; nanofiltration systems; ultrafiltration systems; or microfiltration systems. Many of these water filtration systems 16 employ membrane technology to purify the semi-cleaned water stream 24 to produce potable water stream 26. Some techniques that employ membrane technology include microfiltration (MF); ultrafiltration (UF), reverse osmosis (RO), and nanofiltration (NF). MF membranes have a relatively large pore size and typically reject only large particles and various microorganisms. UF membranes have smaller pores than MF membranes and, therefore, in addition to large particles and microorganisms, they can reject bacteria and soluble macromolecules such as proteins. RO membranes are effectively non-porous and therefore, exclude particles and even many low molar mass species such as salt ions, organics and the like. NF membranes are porous membranes, but since the pores are on the order of ten angstroms or less, they typically exhibit performance between that of the RO and the UF membranes. In some embodiments, the water filtration system 16 can be operated at significantly reduced pressures because the nonpotable water 22 is already partially purified in the thermal purification system 14. For example, in one embodiment, the water filtration system uses a RO system that operates at less than 800 psi and preferably less than 400 psi.

The described invention has the ability beyond other systems to operate in a very efficient manner over an extremely wide range of conditions. Because the system comprises at least two major subsystems and produces two value streams (electricity and water), the system can be tuned, in real time, to provide primarily electricity or alternatively primarily water. The ability to tune the outputs is important because the demand for the two available value streams may vary depending on consumer need. If, for example, the demand for potable water is greater than the need for electricity, the system can reduce the power output of the prime mover, which in turn raises the exhaust energy thereby increasing the rate of potable water production. The increase in potable water production will then fill the increased demand. Alternatively, if the demand for electricity is greater than the need for potable water, the system can produce enough water to fill a storage system and then turn itself down and divert the exhaust to the ambient or for recycle, such as in a traditional standalone power generation device 12.

Figure 2:
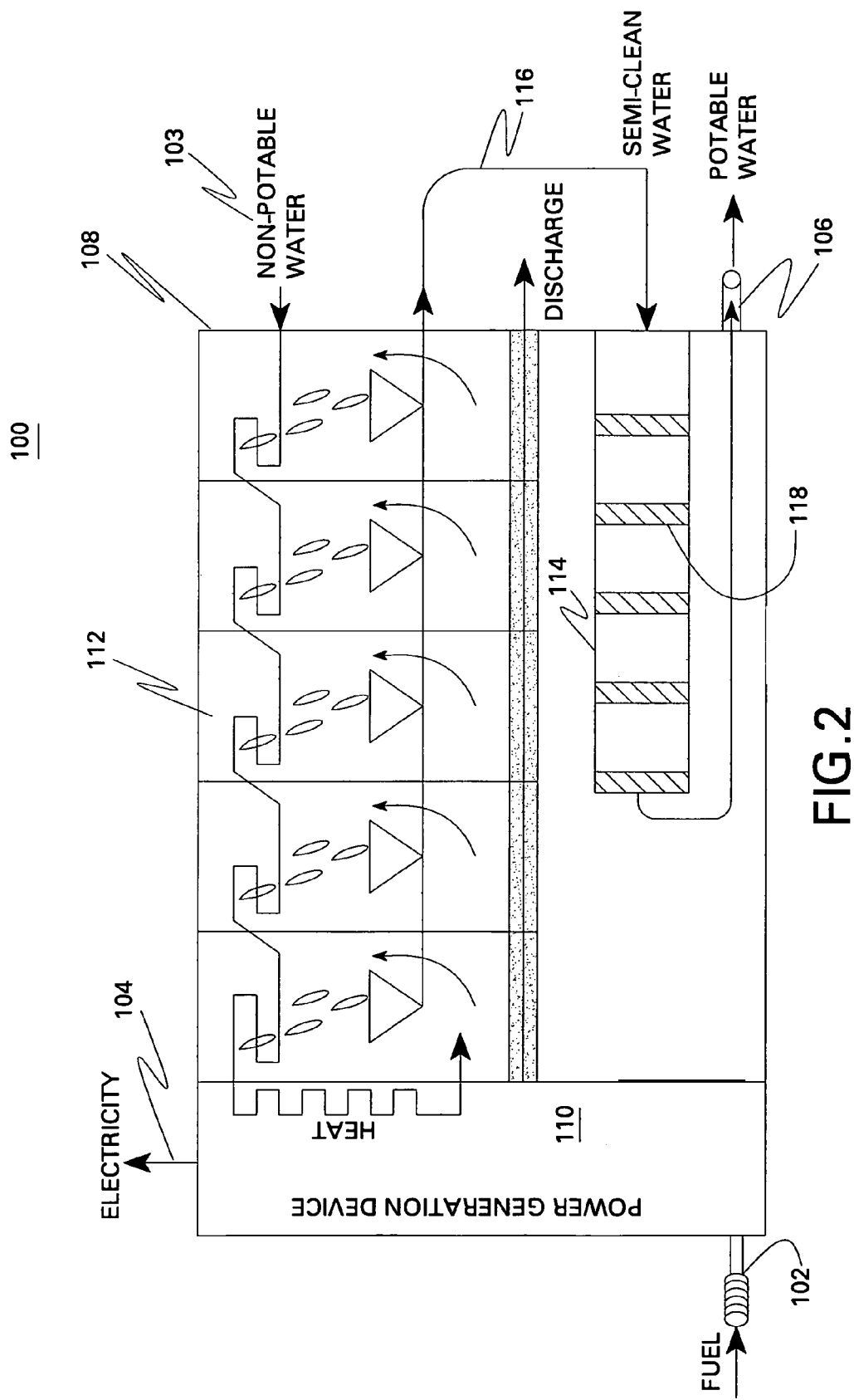
FIG. 2 is a schematic illustration of a containerized hybrid water and power unit in accordance with another embodiment of the instant invention.

FIG. 2 illustrates a containerized hybrid water and power unit 100. Containerized water and power unit 100 has an input for fuel 102 and nonpotable water 103 and produces both electricity 104 and potable water 106, and is housed in a containment vessel 108. This is a mobile, hybrid water and power generation system that can be transported to regions of interest in the containment vessel 108, which vessel 108 physically houses the system and promotes portability of the hybrid configuration.

Containerized hybrid water and power unit 100 comprises a power generation device 110, a thermal purification system 112 and a water filtration system 114. Power generation device 110 can include a variety of power generation configurations including for example, reciprocating engines or small-scale gas turbines. One commercially available power generation device is the GE Jenbacher J208 GS or the J212 GS. The electrical output from the J208 GS unit is between about 250 kw to about 350 kw and thermal output is in the range between about 400 kw to about 500 kw. The thermal output from the power generation device is thermally integrated with the thermal purification system 112 such that the heat is used to purify nonpotable water introduced through input 103. While thermal purification system 112 is shown in FIG. 2 as a multi-stage flash purification process, this is not a limitation of the system. While the invention is discussed in terms of both a thermal purification system 112 and a water filtration system 114, the system can operate with only the thermal purification system 112 under certain operating conditions, for example when the nonpotable water only requires thermal treatment prior to end-use.

An output of the thermal purification system 112 is semi-cleaned water 116. Semi-cleaned water 116 is collected from the thermal purification system 112 and distributed to the water filtration system 114, where it is additionally treated by at least one and typically a plurality of filters 118. In one embodiment, filters 118 are membranes for separating salt ions and impurities from the semi-cleaned water 116 to produce potable water 106. In one embodiment, containerized hybrid water and power unit 100 is contained in a containment vessel that is between 20 ft and 40 ft in length.

Figure 3:
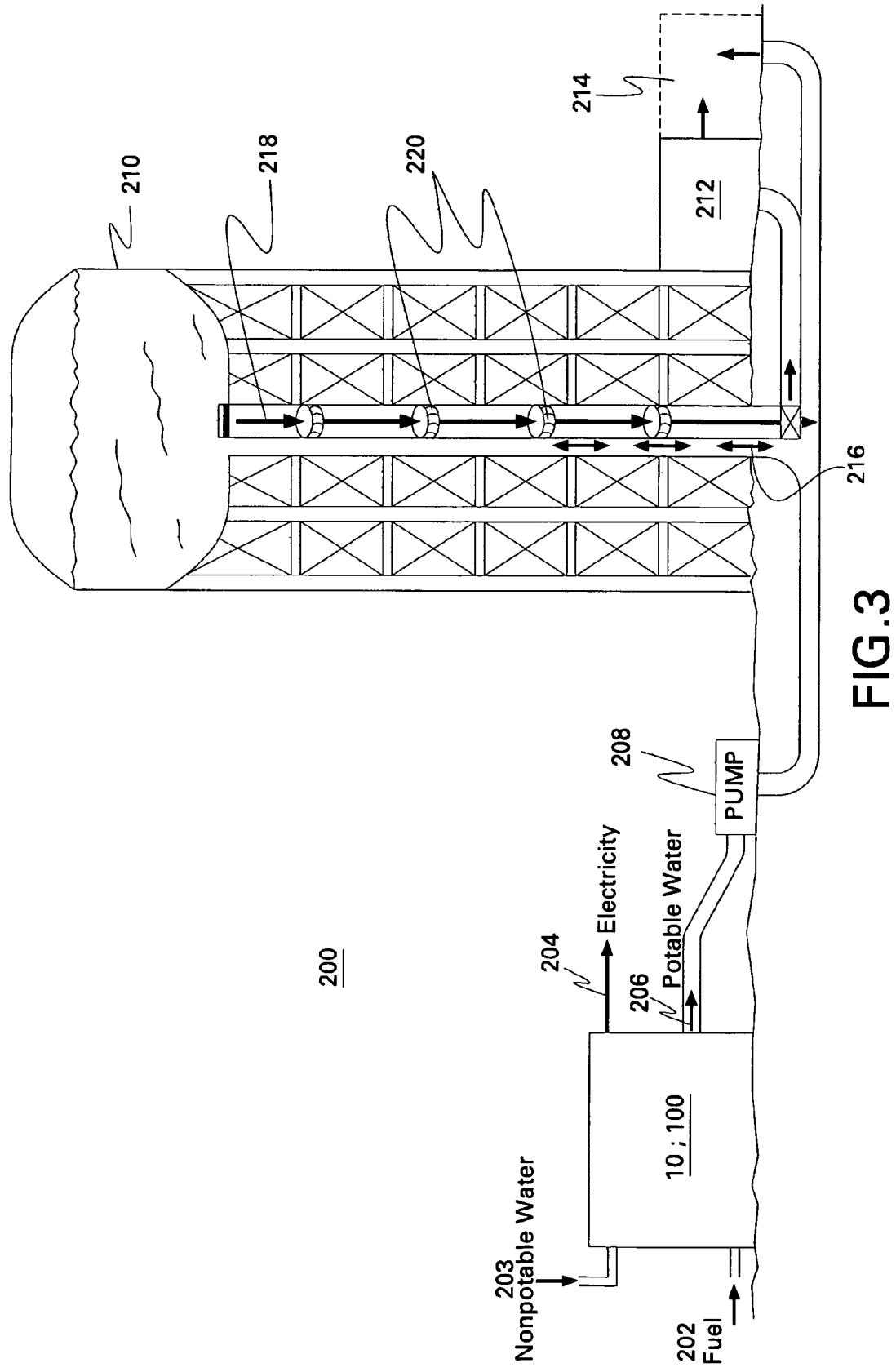
FIG. 3 is a schematic illustration of another embodiment of a hybrid water and power system in accordance with another embodiment of the instant invention.

In another embodiment of the invention, the system further comprises a water tower that is equipped with a pelton style turbine or other appropriate water-based power generation device. As shown in FIG. 3, system 200 comprises a hybrid water purification system 10 or a containerized hybrid power and water unit 100 that receives a fuel 202 and a nonpotable water flow 203 and generates electricity 204 and potable water 206, as discussed in detail above. System 200 further comprises a pump 208, a water tower 210 and a secondary water storage tank 212. As potable water 206 is generated it is pumped via pump 208 to an end-use system 214. If the pump 208 is producing more water than the end-use system 214 requires, the excesss flow is directed along path 216 to water tower 210. If, conversely, the end-use system 214 requires more water than the pump 208 can provide, the water flows back along path 216 from water tower 210 to the end-use system 214. In addition, if additional electricity production is required, water from water tower 210 is directed along alternate path 218 through at least one and typically a series of water based power generation devices 220, for example, pelton style turbines. The water-based power generation devices 220 generate supplemental electricity during periods of high electrical demand or during periods of disruption in fuel service. If end-use system 214 requires more water than the pump 208 can provide, the additional water directed along alternate path 218 to end-use system 214. If, however, the end-use system 214 does not require more water, the additional water is directed to secondary water storage tank 212 for later usage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A hybrid water and power system comprising:
   a power generation device for generating electricity and exhaust gas;
   a thermal purification system that utilizes heat from at least a portion of said exhaust gas to cleanse non-potable water introduced therein to produce a semi-cleaned water stream; and
   a water filtration system for receiving and processing at least a portion of the semi-cleaned water stream to produce a potable water stream.

2. A hybrid water and power system in accordance with claim 1, wherein said power generation device is a distributed power generation device.

3. A hybrid water and power system in accordance with claim 1, wherein said power generation device generates between about 50 KW to about 3000 KW of power.

4. A hybrid water and power system in accordance with claim 1, wherein said power generation device operates at an electrical efficiency in the range between about 15% to about 40%.

5. A hybrid water and power system in accordance with claim 1, wherein said power generation device is a gas turbine.

6. A hybrid water and power system in accordance with claim 1, wherein said power generation device is a reciprocating engine.

7. A hybrid water and power system in accordance with claim 1, wherein said power generation device is an advanced microturbine that produces about 175 KW of power output and has an electrical efficiency of about 35%.

8. A hybrid water and power system in accordance with claim 1, wherein said power generation device is a reciprocating engine that produces about 500 KW of power output and has an electrical efficiency of about 40%.

9. A hybrid water and power system in accordance with claim 1, wherein said power generation device is a gas turbine that produces about 2000KW of power output and has an electrical efficiency of about 24%.

10. A hybrid water and power system in accordance with claim 1, wherein the exhaust gas from said power generation device generates available energy in the range between about 100,000 btu/hr to about 20,000,000 btu/hr.

11. A hybrid water and power system in accordance with claim 1, wherein said power generation device at least partially powers said water filtration system.

12. A hybrid water and power system in accordance with claim 1, wherein said thermal purification system is at least one of a multi-stage flash unit; a multi-effect evaporation system; or a vapor compression system.

13. A hybrid water and power system in accordance with claim 1, wherein said water filtration system comprises at least one of microfiltration; ultrafiltration;
   reverse osmosis; or nanofiltration.

14. A hybrid water and power system in accordance with claim 1, wherein said system is tunable to enable varied rates of electricity generation or potable water generation.

15. A hybrid water and power system in accordance with claim 14, wherein said system is tuned by reducing the power output of the power generation system, thereby raising the exhaust gas temperature and increasing the rate of potable water production.

16. A containerized hybrid water and power system comprising:
   a housing having a fuel input, a nonpotable water input, a potable water output and an electrical output;
   a power generation device for receiving said fuel input and for generating at least a portion of said electrical output and an exhaust gas;
   a thermal purification system that utilizes heat from at least a portion of said exhaust gas to cleanse said non-potable water input to produce a semi-cleaned water stream; and
   a water filtration system for receiving and processing at least a portion of the semi-cleaned water stream to produce said potable water output.

17. A containerized hybrid water and power system in accordance with claim 16, wherein said power generation device is a distributed power generation device.

18. A containerized hybrid water and power system in accordance with claim 16, wherein said power generation device generates between about 50 KW to about 3000 KW of power.

19. A containerized hybrid water and power system in accordance with claim 16, wherein said power generation device operates at an electrical efficiency in the range between about 15% to about 40%.

20. A containerized hybrid water and power system in accordance with claim 16, wherein said power generation device is a gas turbine.

21. A containerized hybrid water and power system in accordance with claim 16, wherein said power generation device is a reciprocating engine.

22. A containerized hybrid water and power system in accordance with claim 16, wherein the exhaust gas from said power generation device generates available energy in the range between about 100,000 btu/hr to about 20,000,000 btu/hr.

23. A hybrid water and power system in accordance with claim 1, wherein said reverse osmosis system is operated at a pressure less than about 800 psi.

24. A hybrid water and power system in accordance with claim 1, wherein said reverse osmosis system is operated at a pressure less than about 400 psi.

25. A hybrid water and power system comprising:
a power generation device for generating electricity and exhaust gas;
a reverse osmosis system to cleanse non-potable water introduced therein to produce a semi-cleaned water stream; and
a purification system that utilizes heat from at least a portion of said exhaust gas to process at least a portion of the semi-cleaned water stream to produce a potable water stream.

26. A hybrid water and power system comprising:
a power generation device for generating electricity and exhaust gas;
a thermal purification system that utilizes heat from at least a portion of said exhaust gas to cleanse non-potable water introduced therein to produce a semi-cleaned water stream;
a water filtration system for receiving and processing at least a portion of the semi-cleaned water stream to produce a potable water stream;
a water tower;
an end-use system; and
at least one pump for pumping said potable water stream to said water tower and to said end-use system.

27. A hybrid water and power system in accordance with claim 26, wherein said pump directs water to said water tower when the potable water stream produced is greater than the potable water required at the end-use system.

28. A hybrid water and power system in accordance with claim 26, wherein said potable water disposed within said water tower is directed to said end-use system when the potable water stream produced is less than the potable water required at the end-use system.

29. A hybrid water and power system in accordance with claim 26, wherein said system further comprises at least one water-based power generation device coupled to said water tower.

30. A hybrid water and power system in accordance with claim 29, wherein said water-based power generation device is a pelton style turbine.

31. A hybrid water and power system in accordance with claim 29, wherein said water from said water tower powers said water-based power generation device and generates supplemental electricity.

32. A hybrid water and power system in accordance with claim 31, wherein said water is directed to at least one of said end-use system or a secondary storage tank.

33. A hybrid water and power system in accordance with claim 1, wherein the thermal purification system is a multi-stage flash unit, or a multi-effect evaporation system, or a vapor compression system.

34. A containerized hybrid water and power system in accordance with claim 16, wherein the thermal purification system is a multi-stage flash unit, or a multi-effect evaporation system, or a vapor compression system.

35. A hybrid water and power system in accordance with claim 26, wherein the thermal purification system is a multi-stage flash unit, or a multi-effect evaporation system, or a vapor compression system.

* * * * *

UNITED STATES PATENT AND TRADEMARK OFFICE
CERTIFICATE OF CORRECTION

PATENT NO. : 7,828,938 B2  Page 1 of 1
APPLICATION NO. : 11/250017
DATED : November 9, 2010
INVENTOR(S) : Bowman It is certified that error appears in the above-identified patent and that said Letters Patent is hereby corrected as shown below:

In Column 2, Line 17, after "generation", insert -- device --, therefor.

In Column 2, Line 22, delete "Electical" and insert -- Electrical --, therefor.

In Column 2, Line 43, delete "corresponding" and insert -- represents the estimated --, therefor.

In Column 2, Line 45, delete "(Eletrical" and insert -- (Electrical --, therefor.

In Column 2, Line 56, delete "effeciency" and insert -- efficiency --, therefor.

In Column 3, Lines 35-46, delete "Again, in................produced." and insert the same at Line 33, after "evaporation", as a continuation of the Paragraph.

In Column 5, Line 15, delete "excesss" and insert -- excess --, therefor.

Signed and Sealed this
Twenty-eighth Day of June, 2011

David J. Kappos
*Director of the United States Patent and Trademark Office*